United States Patent
Gnadinger et al.

(10) Patent No.: US 8,992,694 B2
(45) Date of Patent: Mar. 31, 2015

(54) FLOW RATE SENSOR AND RELATED DISHWASHER

(75) Inventors: Errin Gnadinger, Louisville, KY (US); Kyle Edward Durham, Louisville, KY (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 12/986,401

(22) Filed: Jan. 7, 2011

(65) Prior Publication Data

US 2012/0060874 A1 Mar. 15, 2012

(51) Int. Cl.
| | |
|---|---|
| *B08B 3/00* | (2006.01) |
| *A47L 15/00* | (2006.01) |
| *G01F 1/00* | (2006.01) |
| *A47L 15/42* | (2006.01) |
| *A47L 15/46* | (2006.01) |

(52) U.S. Cl.
CPC ......... *A47L 15/0047* (2013.01); *A47L 15/0049* (2013.01); *A47L 15/0084* (2013.01); *A47L 15/4244* (2013.01); *A47L 15/46* (2013.01); *A47L 2401/14* (2013.01); *A47L 2401/30* (2013.01); *A47L 2501/02* (2013.01); *A47L 2501/05* (2013.01); *A47L 2501/26* (2013.01); *A47L 2501/32* (2013.01); *A47L 2501/34* (2013.01); *Y02B 40/42* (2013.01); *G01F 1/007* (2013.01)
USPC ....................................................... 134/56 D

(58) Field of Classification Search
USPC ................... 134/57 D, 56 D, 58 D, 113, 186; 68/12.05, 12.21
See application file for complete search history.

(56) References Cited

U.S. PATENT DOCUMENTS

| | | | | |
|---|---|---|---|---|
| 1,900,529 | A | * | 3/1933 | Tatham ....................... 134/100.1 |
| 3,283,094 | A | * | 11/1966 | Lung ......................... 200/81.9 R |
| 3,419,695 | A | * | 12/1968 | Dinkelkamp et al. ...... 200/84 R |
| 3,992,941 | A | * | 11/1976 | McGoldrick .................... 73/313 |
| 4,142,079 | A | * | 2/1979 | Bachman ..................... 200/84 C |
| 4,231,324 | A | * | 11/1980 | Schletter ..................... 119/14.17 |
| 4,372,249 | A | * | 2/1983 | Kiestra et al. .............. 119/14.17 |
| 4,976,146 | A | * | 12/1990 | Senghaas et al. ................ 73/313 |
| 5,347,864 | A | * | 9/1994 | Senghaas et al. ................ 73/313 |
| 5,470,142 | A | * | 11/1995 | Sargeant et al. .............. 312/258 |
| 6,470,758 | B1 | * | 10/2002 | Bernard et al. ............ 73/861.51 |

(Continued)

FOREIGN PATENT DOCUMENTS

| | | | |
|---|---|---|---|
| DE | 26 02 714 | * | 7/1977 |
| EP | 499356 | | 8/1992 |

(Continued)

*Primary Examiner* — David Cormier
(74) *Attorney, Agent, or Firm* — Dority & Manning, P.A.

(57) ABSTRACT

A flow rate sensor for a dishwasher includes a container configured for holding an amount of liquid. The container has a known volume corresponding to a vertical activation length, and inlet and a selectively closeable liquid outlet. An upright hollow tube is mounted in the container and has at least one magnetically activated sensor device activatable within the vertical activation length. At least one float is movably mounted to the tube for floating on the liquid. The float includes a magnet therein for activating the sensor device when the float moves the magnet through the vertical activation length. A controller is in electrical communication with the sensor device and includes a timer function. The controller calculates the rate of flow into or out of the container based on the time taken by the float to move through the vertical activation length. Related dishwasher designs are also disclosed.

7 Claims, 5 Drawing Sheets

(56) References Cited

U.S. PATENT DOCUMENTS

| | | | |
|---|---|---|---|
| 6,766,812 B1* | 7/2004 | Gadini | 134/56 D |
| 2005/0241675 A1 | 11/2005 | Jung et al. | |
| 2005/0284507 A1* | 12/2005 | Boesche | 134/56 D |
| 2006/0237044 A1* | 10/2006 | Ferguson et al. | 134/34 |
| 2007/0086556 A1* | 4/2007 | Nakamura et al. | 376/258 |
| 2010/0175718 A1* | 7/2010 | Kedjierski et al. | 134/18 |
| 2011/0138907 A1* | 6/2011 | Rudd et al. | 73/313 |

FOREIGN PATENT DOCUMENTS

| | | | |
|---|---|---|---|
| GB | 2 050 626 | * | 1/1981 |
| JP | 02-038816 | * | 2/1990 |
| JP | 05-056907 | * | 3/1993 |
| JP | 10-262896 | * | 10/1998 |
| JP | 2001-082344 | * | 3/2001 |
| JP | 2002-000536 | * | 2/2002 |
| JP | 2006-320394 | * | 11/2006 |

* cited by examiner

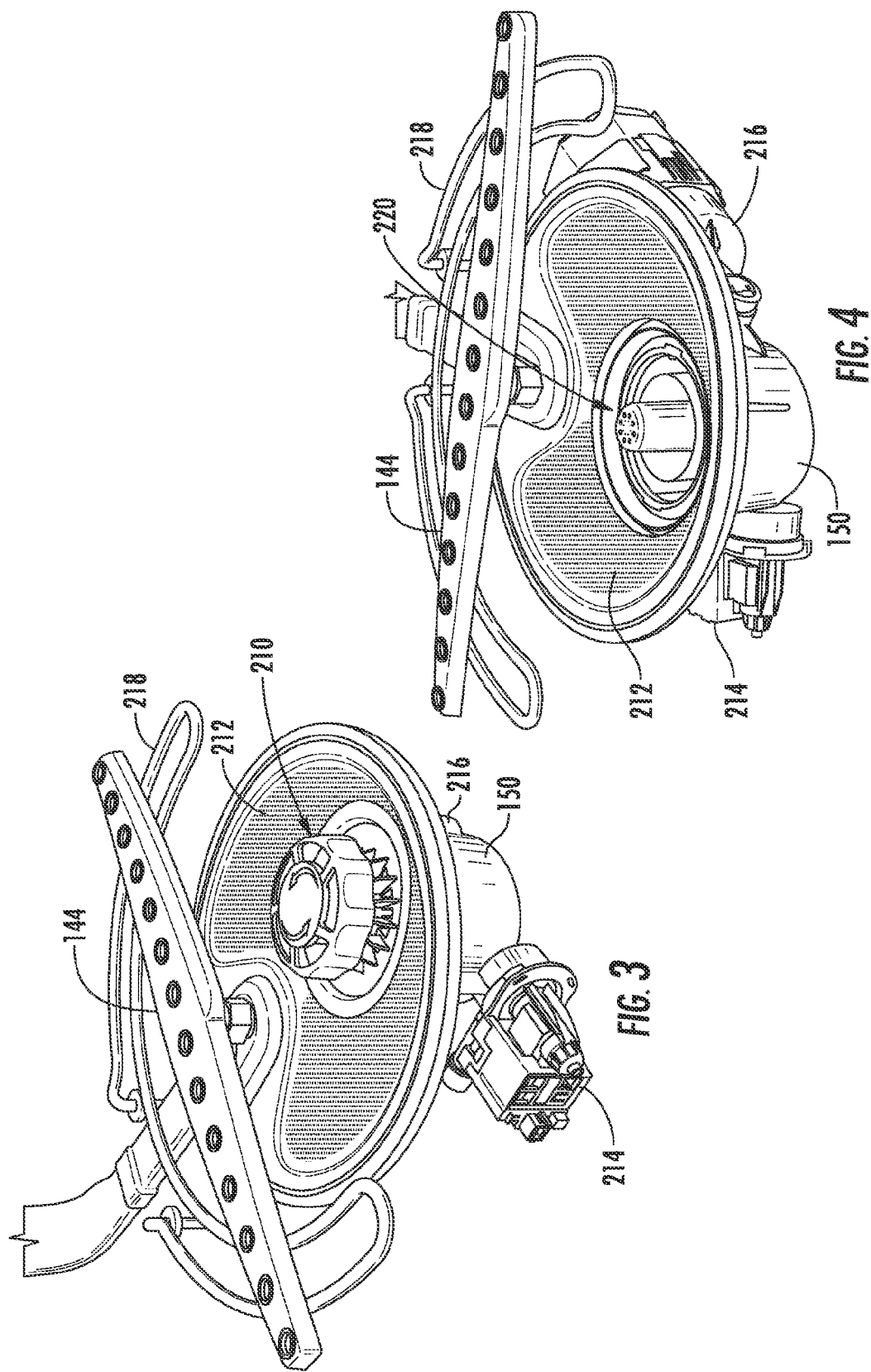

FLOW RATE SENSOR AND RELATED DISHWASHER

FIELD OF THE INVENTION

The present disclosure relates generally to flow rate sensors which can be used in a dishwasher.

BACKGROUND OF THE INVENTION

Dishwashers of various types have been proposed wherein items are placed in a wash chamber which is filled and emptied according to desired wash sequences. Recently, dishwasher manufacturers have focused even more on efficiency in implementing new designs. Thus, an amount of electricity, an amount of detergent, and an amount of water used are all monitored in an attempt to provide efficient and environmentally sensitive machines.

Certainly, an amount of water must be used to wash and rinse items within the dishwasher. It would be desirable to minimize this amount by controlling the operation of the dishwasher. However, if enough water is not used at certain times in the cycle, items may not be cleaned or rinsed sufficiently due to inadequate water supply for intended operation. Conventional dishwasher controls often use timers to determine how long certain items within the dishwasher should run.

For example, a pump may be turned on for a given amount of time to fill or drain the wash chamber. However, due to variations in local water pressure, potential clogging, etc., such timing control may provide effective yet less than optimal performance in some applications. For, example, if a sump is completely drained as a set time of pump operation has been performed, the pump may make undesirable noise. Alternatively, if a sump is partially clogged, running a pump for a set amount of time might not fully drain the sump as desired. Therefore, simply operating a fluid handling device within a dishwasher for a given amount of time may not provide the desired performance in all situations or installations.

Accordingly, other designs for flow sensing and control devices and related dishwashers including those addressing one or more drawbacks of conventional devices and dishwashers would be welcome.

BRIEF DESCRIPTION OF THE INVENTION

Aspects and advantages of the invention will be set forth in part in the following description, or may be obvious from the description, or may be learned through practice of the invention.

According to certain aspects of the present disclosure, a flow rate sensor for a dishwasher includes a container configured for holding an amount of liquid. The container has a known volume corresponding to a vertical activation length, and has a liquid inlet and a selectively closeable liquid outlet. An upright hollow tube is mounted in the container. The tube houses at least one magnetically activated sensor device activatable within the vertical activation length. At least one float is movably mounted to the tube for floating on the liquid. The float includes a magnet therein for activating the sensor device when the float moves the magnet through the activation length. A controller is in electrical communication with the sensor device and includes a timer function. The controller calculates the rate of flow into or out of the container based on the time taken by the float to move through the vertical activation length. Various options and modifications are possible.

According to certain other aspects of the disclosure, a dishwasher includes a cabinet and a wash compartment within the cabinet. The wash compartment has a water inlet and a water outlet in the form of a sump. The sump is configured for holding an amount of liquid and has a known volume corresponding to a vertical activation length. The sump further has a selectively closeable liquid outlet. An upright hollow tube is mounted in the sump. The tube houses at least one magnetically activated sensor device activatable within the vertical activation length. At least one float is movably mounted to the tube for floating on the liquid. The float includes a magnet therein for activating the sensor device when the float moves the magnet through the activation length. A controller in the cabinet is in electrical communication with the sensor device and includes a timer function, the controller calculating the rate of flow into or out of the sump based the time taken by the float to move through the vertical activation length. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 provides a perspective view of a portion of the bottom of a dishwasher as in FIG. 1;

FIG. 4 provides a perspective view of the dishwasher portion of FIG. 3 with the manual filter cover removed showing a float sensor within a sump;

DETAILED DESCRIPTION OF THE INVENTION

Figure 1:
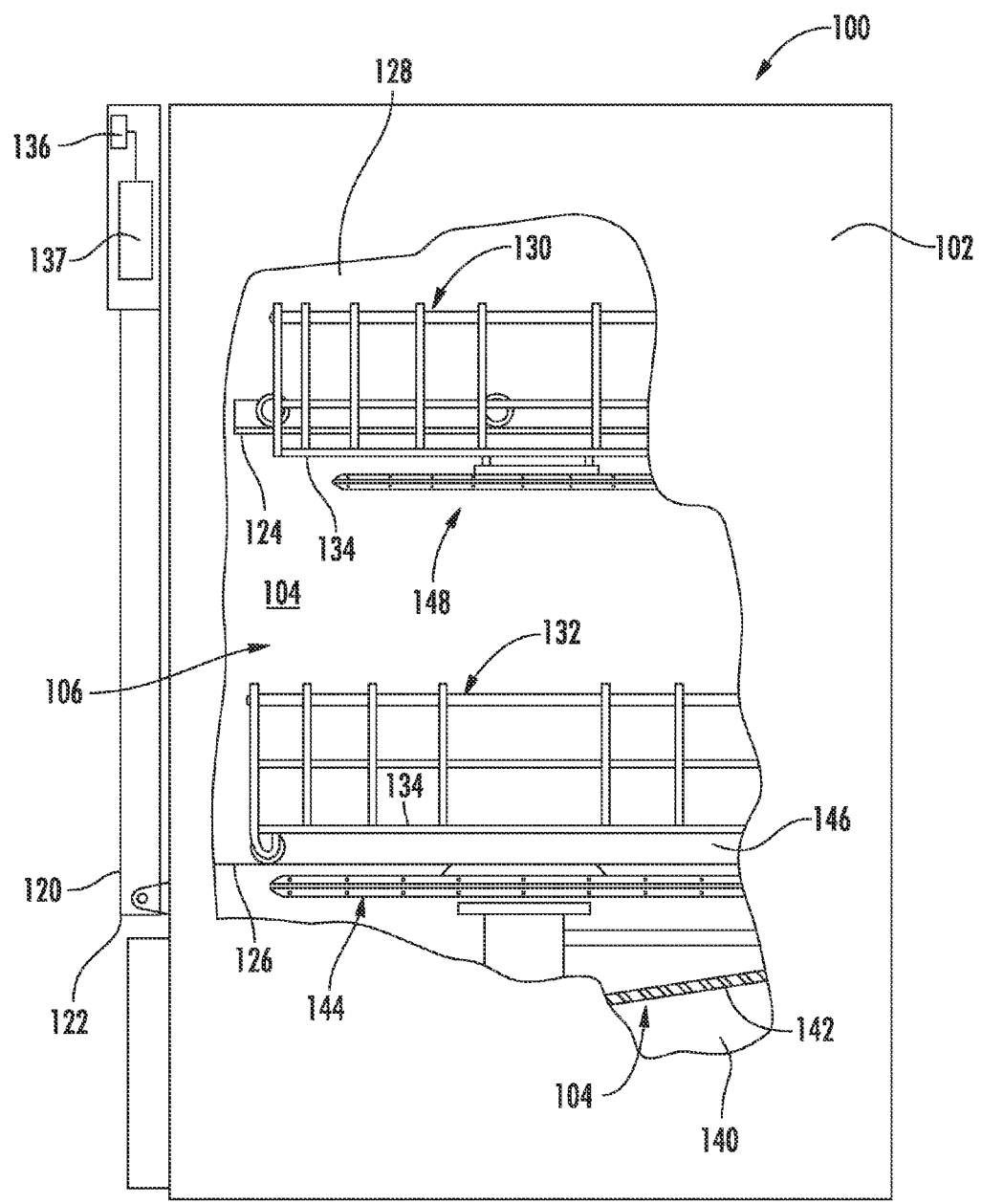
FIG. 1 provides a side partial cut-away view of an exemplary dishwasher that may be configured in accordance with aspects of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As discussed in greater detail below, embodiments of the present disclosure relate to a flow sensing float device that can be used with a dishwasher. FIG. 1 depicts an exemplary domestic dishwasher 100 that may be configured in accordance with aspects of the disclosure. For the particular embodiment of FIG. 1, the dishwasher 100 includes a cabinet 102 having a tub 104 therein that defines a wash chamber 106. The tub 104 includes a front opening (not shown in FIG. 1) and a door 120 hinged at its bottom 122 for movement between a normally closed vertical position (shown in FIG. 1) wherein the wash chamber 106 is sealed shut for washing operation, and a horizontal open position for loading and unloading of articles from the dishwasher. Upper and lower guide rails 124, 126 are mounted on tub side walls 128 and accommodate upper and lower roller-equipped racks 130, 132, respectively. Each of the upper and lower racks 130, 132 is fabricated into lattice structures including a plurality of elongate members 134, and each rack 130, 132 is adapted for movement between an extended loading position (not shown) in which the rack is substantially positioned outside the wash chamber 106, and a retracted position (shown in FIG. 1) in which the rack is located inside the wash chamber 106. A silverware basket (not shown) may be removably attached to the lower rack 132 for placement of silverware, utensils, and the like, that are too small to be accommodated by the upper and lower racks 130, 132.

The dishwasher 100 further includes a lower spray-arm-assembly 144 that is rotatably mounted within a lower region 146 of the wash chamber 106 and above a tub sump portion 142 so as to rotate in relatively close proximity to the lower rack 132. A mid-level spray-arm assembly 148 is located in an upper region of the wash chamber 106 and may be located in close proximity to upper rack 130. Additionally, an upper spray arm assembly (not shown) may be located above the upper rack 130.

The lower and mid-level spray-arm assemblies 144, 148 and the upper spray arm assembly are fed by a fluid circulation assembly for circulating water and dishwasher fluid in the tub 104. The fluid circulation assembly may be located in a machinery compartment 140 located below the bottom sump portion 142 of the tub 104, as generally recognized in the art. Each spray-arm assembly includes an arrangement of discharge ports or orifices for directing washing liquid onto dishes or other articles located in the upper and lower racks 130, 132, respectively. The arrangement of the discharge ports in at least the lower spray-arm assembly 144 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 137 to regulate operation of the dishwasher 100. The controller may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area of door 120 as shown. In such an embodiment, input/output ("I/O") signals may be routed between the control system and various operational components of dishwasher 100 along wiring harnesses that may be routed through the bottom 122 of door 120. Typically, the controller 137 includes a user interface panel 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

It should be appreciated that the invention is not limited to any particular style, model, or other configuration of dishwasher, and that the embodiment depicted in FIG. 1 is for illustrative purposes only. For example, instead of the racks 130, 132 depicted in FIG. 1, the dishwasher 100 may be of a known configuration that utilizes drawers that pull out from the cabinet and are accessible from the top for loading and unloading of articles.

Figure 2:
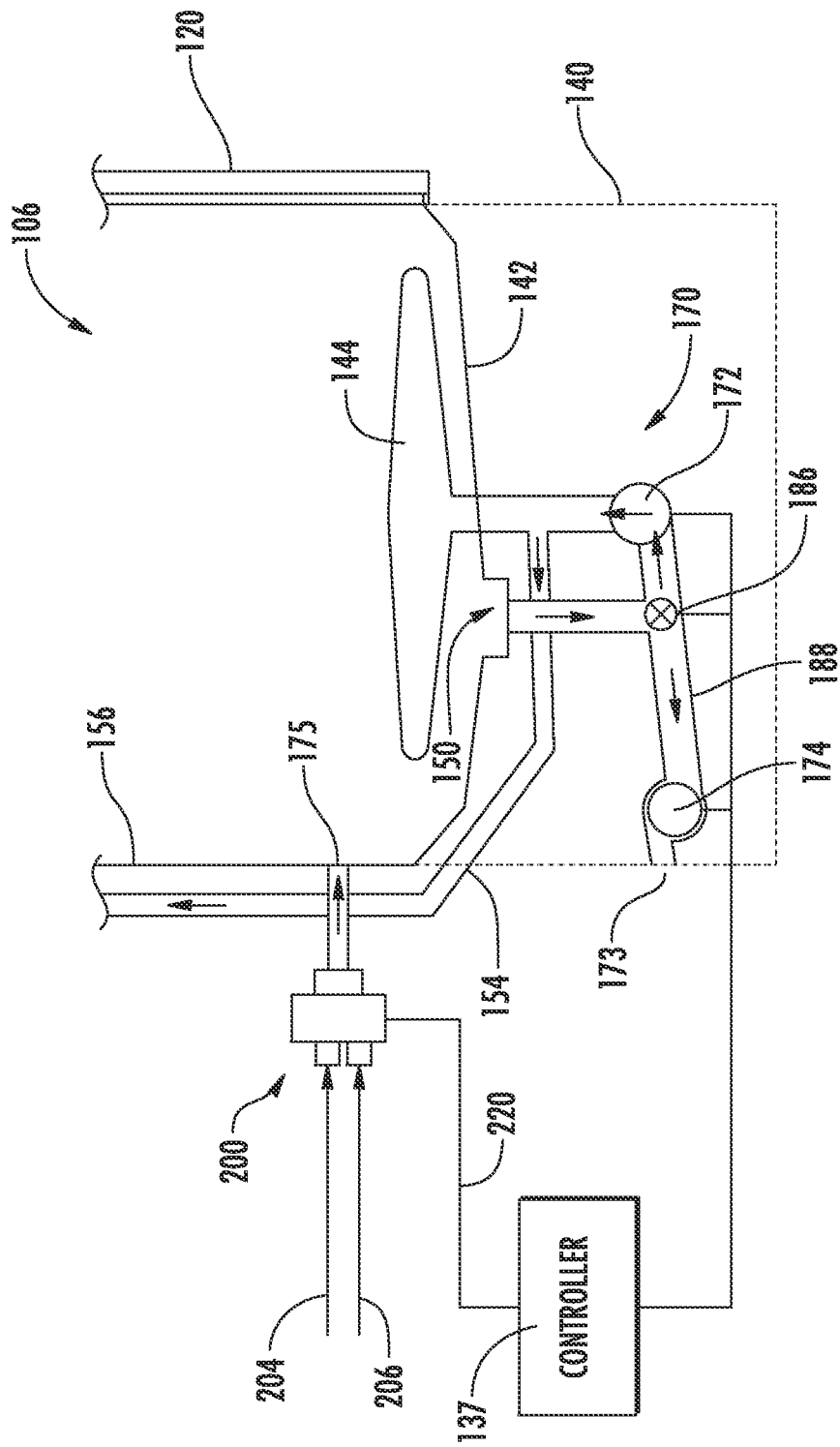
FIG. 2 is a schematic view of one possible fluid system the dishwasher of FIG. 1.

FIG. 2 schematically illustrates an embodiment of a fluid circulation assembly 170 configured below the wash chamber 106. Although one embodiment of a fluid circulation assembly that is operable to perform in accordance with aspects of the disclosure is shown, it is contemplated that other fluid circulation assembly configurations may similarly be utilized without departing from the spirit and scope of the invention. The fluid circulation assembly 170 includes a circulation pump assembly 172 and a drain pump assembly 174, both in fluid communication with the sump 150. Additionally, the drain pump assembly 174 is in fluid communication with an external drain 173 to discharge used wash liquid. Further, the circulation pump assembly 172 is in fluid communication with lower spray arm assembly 144 and conduit 154 which extends to a back wall 156 of wash chamber 106, and upward along the back wall 156 for feeding wash liquid to the mid-level spray arm assembly 148 (FIG. 1) and the upper spray arm assembly. This configuration also applies to a drawer-type of dishwasher, as mentioned above.

As wash liquid is pumped through the lower spray arm assembly 144, and further delivered to the mid-level spray arm assembly 148 and the upper spray arm assembly (not shown), washing sprays are generated in the wash chamber 106, and wash liquid collects in the sump 150. The sump 150 may include a cover to prevent larger objects from entering the sump 150, such as a piece of silverware or another dishwasher item that is dropped beneath lower rack 132. A coarse filter and a fine filter (not shown) may be located adjacent the sump 150 to filter wash liquid for sediment and particles of predetermined sizes before flowing into the sump 150. Furthermore, a turbidity sensor may be coupled to the sump 150 and used to sense a level of sediment in the sump 150 and to initiate a sump purge cycle where the contents or a fractional volume of the contents of the sump 150 are discharged when a turbidity level in the sump 150 approaches a predetermined threshold. The sump 150 is filled with water through an inlet port 175 which outlets into wash chamber 106, as described in greater detail below.

As shown, a drain valve 186 is established in flow communication with the sump 150 and opens or closes flow communication between the sump 150 and a drain pump inlet 188. The drain pump assembly 174 is in flow communication with the drain pump inlet 188 and may include an electric motor for pumping fluid at the inlet 188 to an external drain system via drain 173. In one embodiment, when the drain pump is energized, a negative pressure is created in the drain pump inlet 188 and the drain valve 186 is opened, allowing fluid in the sump 150 to flow into the fluid pump inlet 188 and be discharged from fluid circulation assembly 170 via the external drain 173. Alternatively, pump assemblies 172 and 174 may be connected directly to the side or the bottom of sump 150, and the pump assemblies may each include their own valving replacing drain valve 186. Other fluid circulation systems are possible as well, drawings fluid from sump 150 and providing as desired within wash chamber 106 or draining out of washing machine 100.

Referring to FIG. 2, a water supply 200 may be configured with the inlet port 175 for supplying wash liquid to the wash chamber 106. The water supply 200 may provide hot water only, cold water only, or either selectively as desired. As depicted, water supply 200 has a hot water inlet 204 that receives hot water from an external source, such as a hot water heater and a cold water input 206 that receives cold water from an external source. It should be understood that the term "water supply" is used herein to encompass any manner or combination of valves, lines or tubing, housing, and the like, and may simply comprise a conventional hot or cold water connection.

FIGS. 3 and 4 show perspective views of a bottom portion of a wash chamber 106. As shown, a sump 150 is disposed beneath a large particle filter housing 210 and substantially surrounded by a fine filter area 212. Liquid in the bottom of a wash chamber can drain into sump 150 either through large particle filter housing 210 or through the various holes in fine filter 212. As shown, a drain pump assembly 214 and a recirculation pump assembly 216 are attached to a side of sump 150 for pumping water out when desired. Heating element 218 is provided for drying and spray arm assembly 144 extends upward rotatably to spray liquid throughout the wash chamber. The elements described so far are somewhat conventional, and various options and modifications are possible to the structure illustrated.

Figure 5:
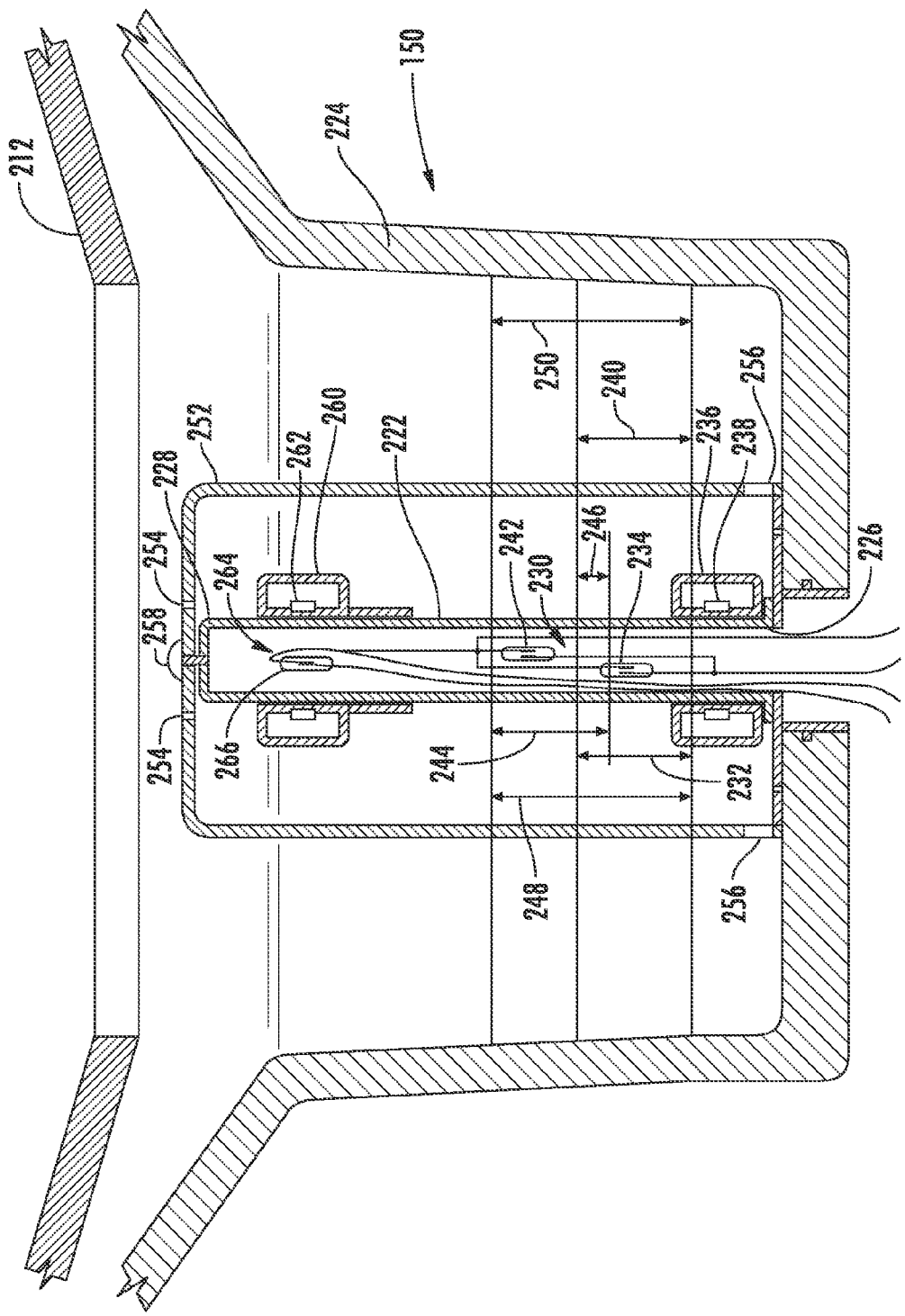
FIG. 5 provides a diagrammatical cross-sectional view of a float sensor within a sump.

As shown in FIG. 4, housing 210 is removable from within fine filter area 212 by a user, for example for cleaning. Removing large particle filter housing 210 exposes the inside of sump 150 and a float valve 220 mounted in the sump. FIG. 5 schematically shows the arrangement of float valve 220 within sump 150 in greater detail.

FIG. 5 shows a detailed diagrammatical depiction of sump 150 with one example of a float valve 220 according to the present disclosure. As shown, float valve 220 includes an upright hollow tube 222 mounted in sump housing 224, which is in somewhat of the form of a large pot-shaped container. Openings (not shown in FIG. 5) may be provided in the sides or bottom of the sump housing to attach passageways to fill or empty the sump, valves, pumps, etc., as discussed above. Tube 222 has a length from its base 226 to its tip 228. Tube 222 houses within it at least one magnetically activated sensor device 230 having a vertical activation length 232 shorter than but located within the full length of the tube (from base 226 to tip 228).

As shown, sensor device 230 includes at least one reed switch 234 that can be changed between states by exposure to a magnetic field. As shown, reed switch 234 is a normally open reed switch that is closed (completing a circuit) when exposed to a sufficiently strong magnetic field. However, it should be understood that a normally closed reed switch could also be employed with corresponding changes in electrical connections as discussed below. Vertical activation length 232 is the vertical distance over which a magnet will change the state of sensor device 230.

As shown, at least one float 236 is movably mounted to tube 222 for floating on liquid within sump 150. Float 236 includes one or more magnets 238 therein for activating sensor device 230 when the float moves the magnet through activation length 232. Interacting ribs or other structure (not shown) may be provided on an inside surface of float 236 and the outside of tube 222 to maintain orientation of the float relative to the tube, and accordingly to maintain magnet 238 at a given orientation relative to reed switch, if desired.

Sump housing 224 has a known or determined volume. In particular, a volume of the sump housing corresponding to vertical activation length 232 is known and/or determined. Therefore, for reed switch 234 has a vertical activation length 232 which corresponds to a known volume 240 within sump housing 224. Therefore, if a signal from reed switch is electrically connected to controller 137, and controller 137 includes a timer function, a rate of flow of water into or out of sump housing 224 can be calculated based on the known volume and the time taken by the float to move through the vertical activation length. That flow rate (volume/time) can be benchmarked when washing machine 100 is built or installed, or a measured flow rate can be compared to a preexisting table of benchmarked flow rates corresponding to different states stored within a memory of controller 137. Such states could be normal fill, normal drain, partial clog, heavy clog, etc. Such comparison by controller could be used to provide an indication of the state to a user via user interface device 136, to automatically stop, terminate or change cycles, reverse a pump automatically or manually to clear a clog, etc.

Also, such comparison can be used to fine tune the cycles in various ways. Comparisons can be based on filling or emptying (upward or downward float action), as is relevant to a desired filling or emptying function.

For example, controller 137 could control an inlet pump to pump a given volume of water into wash compartment 106 responsive the sensed time taken by float 236 to move through vertical activation length 232. Similarly, controller 137 could control an outlet pump to pump a given volume of water out of wash compartment 106 responsive the sensed time. Therefore, flow rates can be used to fine tune the pumping, rather than just turning the pumps on for a given duration of time. Such fine tuning can provide a more efficient use of water (with less waste or overfilling). Also, such fine tuning can prevent the sometimes noisy situation where a pump in the sump might over-rain the sump, causing a loud air sucking sound.

To improve the accuracy of sensor device 230 a second reed switch 242 can be used, wired in parallel but offset vertically relative to first reed switch 234. Accordingly, as shown reed switch 242 has a vertical activation length 244 that has an overlap 246 with that of reed switch 234 to therefore provide an vertical activation length 248 larger than either of the single lengths 232 and 244. Because of the overlap 246, the total vertical activation length 248 is slightly less than the total of lengths 232 and 244. Volume 250 in sump corresponds to length 248. Because the reed switches are wired in parallel, as long as either switch is activated by the magnet, and such activation overlaps, sensor device 230 will be activated continuously for the entire activation length 248. Using the larger length and corresponding larger volume 250 provides an opportunity for a more accurate measurement of flow rate by essentially using a larger sample size. Otherwise, a two or more reed switch sensor device as disclosed operates according to the same principles above.

It should be understood that, to keep accuracy high in production versions, the known volume corresponding to vertical activation length should be accurately measured and programmed into controller memory. Alternatively, such known volume can be determined in each device based on production testing or periodic resetting once in the field. In any event, the accuracy of the flow rate calculation is only as accurate as the calculation of the volume of water corresponding to the vertical activation length.

A protective cover 252 may be removably provided over tube 222. Openings 254 and 256 in cover 252 allow air and water to pass into and out of the cover. Openings 254 and 256 or others should be large enough to allow the water level within cover 252 to be substantially the same as outside of cover so that the device is accurate as to flow in sump 150. Further, surrounding tube 222 with housing 252 prevents sloshing and potential inaccurate or discontinuous readings. Cover 252 may be attached to tube by a screw 258 or other user-operable structure.

A second float 260 with an embedded magnet or magnets 262 may be provided at a top area of tube 222. A sensor device 264 such as a reed switch 266 may be provided at this location as a "flood valve." In other words, if sump becomes too full, either because too much water has been added, the drain is clogged, etc, as a safety mechanism the float 260 moves upward to deactivate reed switch 266, signaling controller 137 of the over-filled issue. Controller 137 may then signal the user via the user interface, turn off an inlet pump, turn on a drain pump, etc. as desired. Float 260 and sensor device 264 therefore need not be used to calculate a flow rate, as above.

Figure 6:
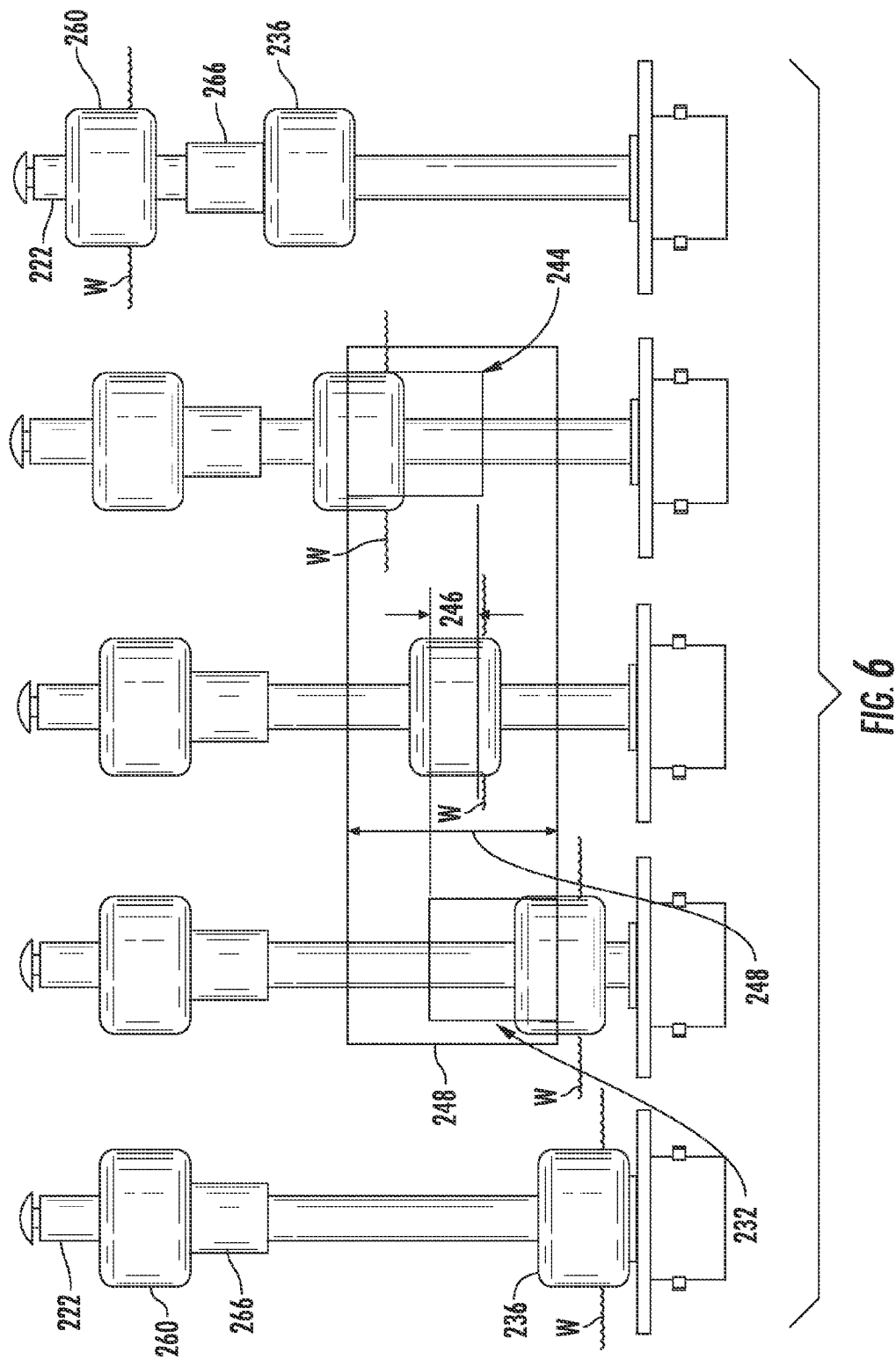
FIG. 6 provides a side view showing progressive movement of the floats on float sensor with liquid level within the sump at different levels.

FIG. 6 shows, from left to right, movement of floats 236 and 260 upward as water level W rises within the sump. In the leftmost example, the water level is low and sensor device 230 is not activated. In the second through fourth examples, float 236 moves upward through vertical activation length 248 comprising overlapping lengths 232 and 244 while the sensor device is activated. When float 236 moves up further, it reaches bottom of stop 266 deactivating the sensor device again. Float 260 lies on top of stop 266. If water level W rises further, float 260 rises off stop 266 until the flood sensor device is deactivated (or activated, depending on whether the flood sensor is normally open or closed and depending on its location). Using a normally opened reed switch as a flood sensor closed when float 260 is on stop 266 provides a quick and reliable signal so that shut off or other steps can be taken if sump is overfilled.

It should be understood that various modifications are possible. Thus, other types of sensors may be employed for one or all positions. For example, a hall effect sensor, or other electro-optical sensor could alternatively be employed.

In view of the above, a simple and reliable float sensor device is provided for determining a flow rate. Such device can be used not only within a dishwasher but also within other devices. Overlapping parallel wired sensor devices can be provided for heightened accuracy. A flood type shut off valve can also be included in the device. Washing machine cycles can be performed more efficiently and more reliably in various ways since feedback in the form of actual flow rates can be used for control, rather than just predicted rates. Operation can be adjusted or fine tuned accordingly based on such feedback to achieve more economical and environmentally friendly function.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flow rate sensor for measuring a clog condition in a dishwasher comprising:
    a container configured for holding an amount of liquid, the container having a known volume corresponding to a vertical activation length, a liquid inlet and a selectively closeable liquid outlet;
    an upright hollow tube mounted in the container, the tube housing at least one magnetically activated sensor device activatable within the vertical activation length, the sensor device including a plurality of reed switches wired in parallel and spread vertically though the vertical activation length with overlap to provide continuous sensing throughout the entire vertical activation length;
    at least one float movably mounted to the tube for floating on the liquid, the float including a magnet therein for activating the sensor device when the float moves the magnet through the vertical activation length;
    a flood sensor housed in the tube above the sensor device and a flood sensor float movably mounted on the tube above the float, the flood sensor float floating upward to activate the flood sensor when the amount of liquid in the container reaches a maximum permissible level; and
    a controller in electrical communication with the sensor device and the flood sensor, and including a timer function, the controller programmed to calculate the rate of flow into or out of the container based on the time taken by the float to move through the vertical activation length, the controller programmed to determine when the amount of liquid in the container reaches the maximum permissible level based on communication with the flood sensor, the float moving downward through the vertical activation length at a first rate if the container is clear and at a second rate slower than the first rate if the container is at least partially clogged, the controller programmed to generate a first signal to indicate to a user via a user interface that the container is at least partially clogged when the float moves downward at the second rate, the controller programmed to generate a second signal to indicate to a user via the user interface that the amount of liquid in the container has reached the maximum permissible level.

2. The sensor of claim 1, wherein the flood sensor is a magnetic reed switch.

3. A dishwasher that can indicate a clog condition comprising:
    a cabinet having a user interface;
    a wash compartment within the cabinet having a water inlet and a water outlet in the form of a sump, the sump configured for holding an amount of liquid, the sump having a known volume corresponding to a vertical activation length, the sump further having a selectively closeable liquid outlet;
    an upright hollow tube mounted in the sump, the tube housing at least one magnetically activated sensor device activatable within the vertical activation length, the sensor device including a plurality of reed switches wired in parallel and spread vertically though the vertical activation length with overlap to provide continuous sensing throughout the entire vertical activation length;
    at least one float movably mounted to the tube for floating on the liquid, the float including a magnet therein for activating the sensor device when the float moves the magnet through the activation length;

a flood sensor housed in the tube above the sensor device and a flood sensor float movably mounted on the tube above the float, the flood sensor float floating upward to activate the flood sensor when the amount of liquid in the wash compartment reaches a maximum permissible level; and a controller in the cabinet in electrical communication with the user interface, the sensor device and the flood sensor, and including a timer function, the controller programmed to calculate the rate of flow into or out of the sump based on the time taken by the float to move through the vertical activation length, the controller programmed to determine when the amount of liquid in the sump reaches the maximum permissible level based on communication with the flood sensor, the float moving downward through the vertical activation length at a first rate if the sump is clear and at a second rate slower than the first rate if the sump is at least partially clogged, the controller programmed to generate a signal to indicate to a user via a user interface that the sump is at least partially clogged when the float moves downward at the second rate, the controller programmed to generate a second signal to indicate to a user via the user interface that the amount of liquid in the sump has reached the maximum permissible level.

4. The dishwasher of claim 3, wherein the flood sensor is a magnetic reed switch.

5. The dishwasher of claim 3, wherein the controller is programmed to control an inlet pump to pump a given volume of water into the wash compartment responsive the sensed time taken by the float to move through the vertical activation length.

6. The dishwasher of claim 3, wherein the controller is programmed to control an outlet pump to pump a given volume of water out of the wash compartment responsive the sensed time taken by the float to move through the vertical activation length.

7. The dishwasher of claim 6, wherein the given volume of water pumped out of the wash compartment is not enough to empty the sump so that the outlet pump is no longer submerged.

\* \* \* \* \*